March 12, 1957  E. J. DILLMAN ET AL  2,785,253
CONTROL DEVICE

Filed July 28, 1954  3 Sheets-Sheet 1

INVENTORS
EARNEST J. DILLMAN
FRED C. GALLEY
BY
Andrew K. Foulds
THEIR ATTORNEY

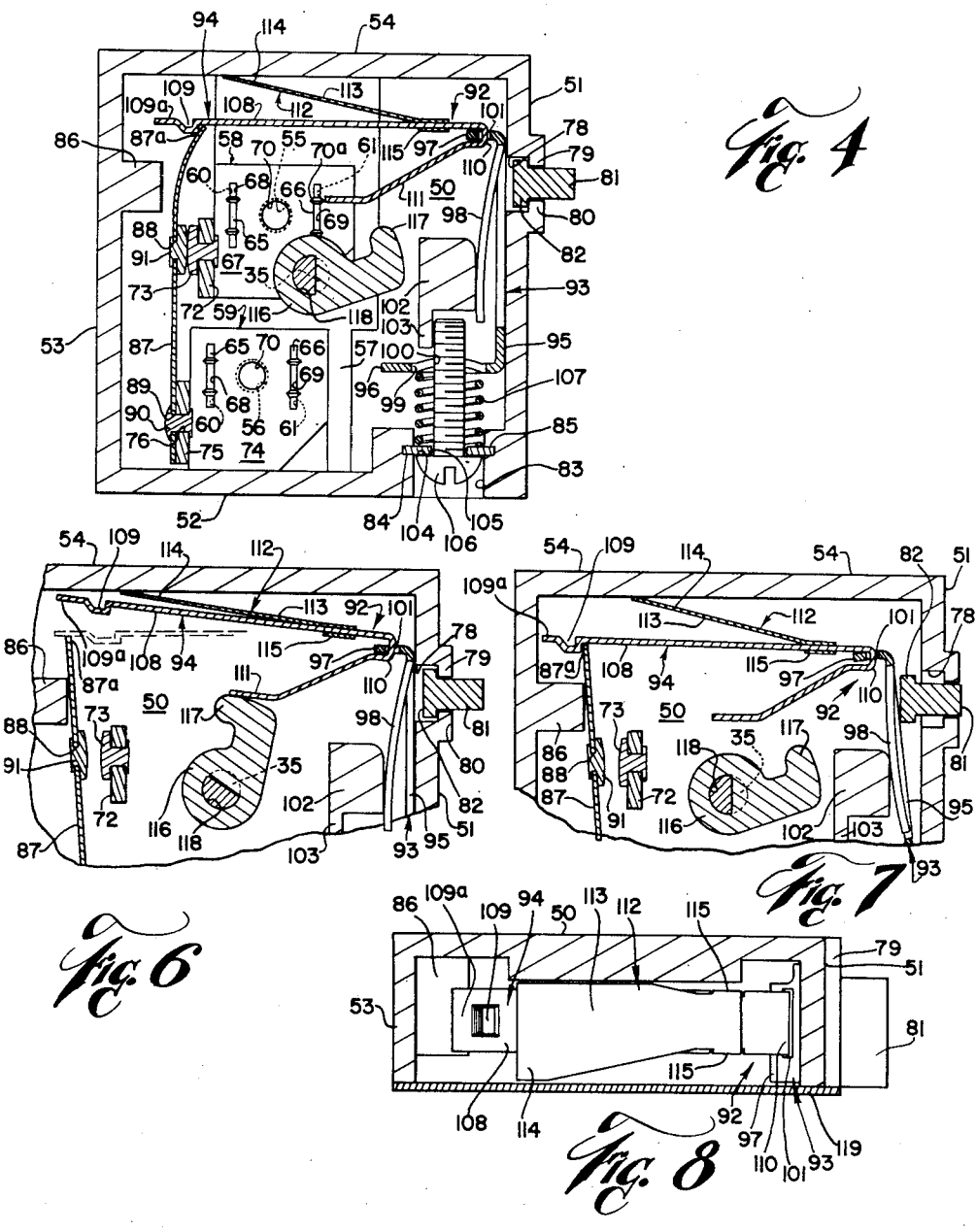

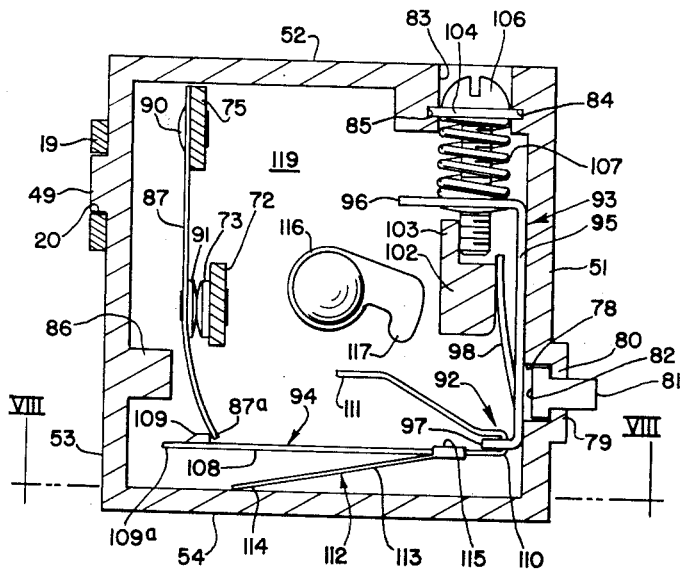
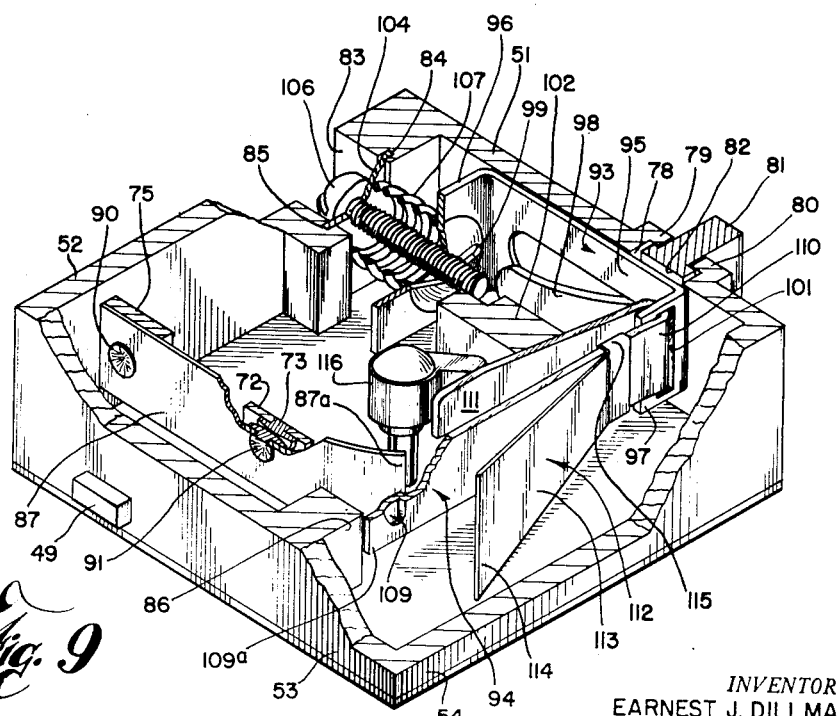

United States Patent Office 2,785,253
Patented Mar. 12, 1957

2,785,253

CONTROL DEVICE

Earnest J. Dillman and Fred C. Galley, Detroit, Mich., assignors to Detroit Controls Corporation, Detroit, Mich., a corporation of Michigan Application July 28, 1954, Serial No. 446,302

11 Claims. (Cl. 200—138)

This invention relates to new and useful improvements in control devices and more particularly to a control device having reset means.

An object of this invention is to provide a control device that is operable to open an electrical circuit upon the occurrence of a predetermined condition.

Another object is to provide a control device that may be adjusted to respond to different predetermined conditions.

Another object is to provide a reset means that is ineffective upon the presence of a predetermined condition.

Another object is to provide a control device that will open an electrical circuit upon the occurrence of a predetermined condition and remain in an open condition while said predetermined condition remains.

Another object is to provide a control device that is economically manufactured, easily assembled, and sturdy in construction.

Figure 1:
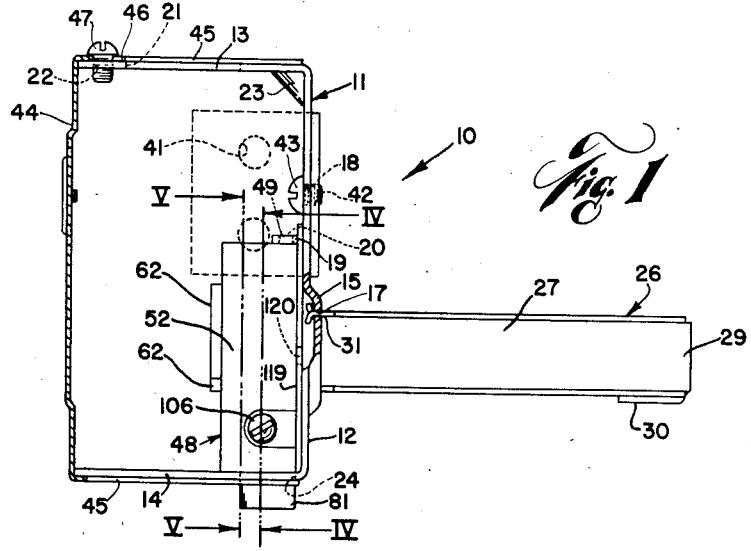
Figure 2:
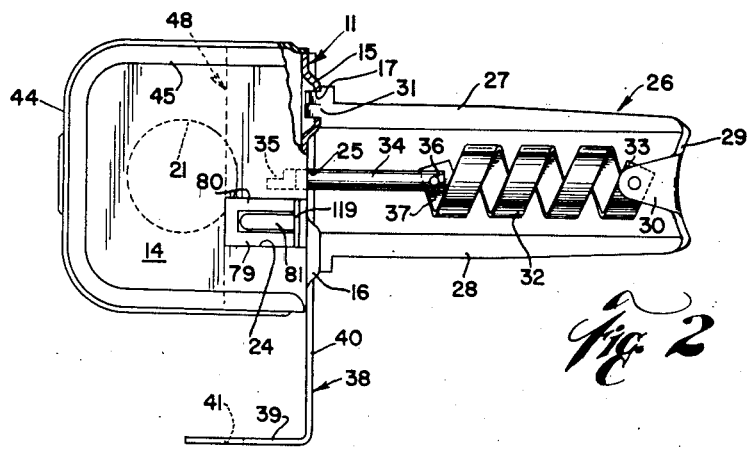
Figure 3:
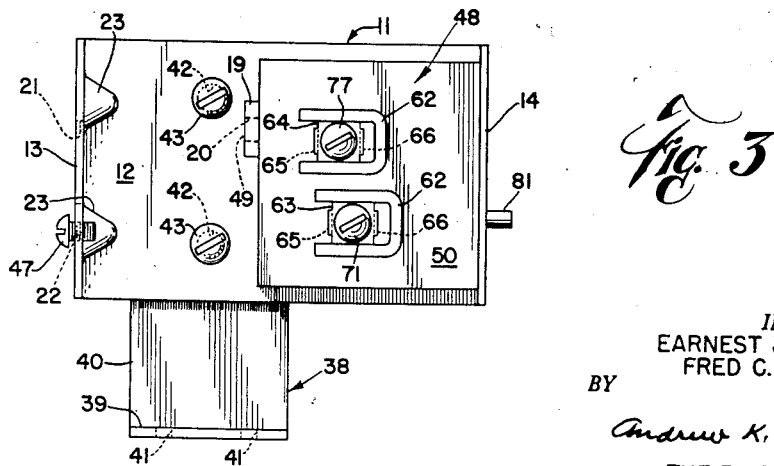

Other objects will become apparent from the following description of the preferred embodiment illustrated in the accompanying drawings in which Figure 1 is a side elevation of the control device with the casing broken away to show the internal structure, Fig. 2 is a bottom plan view of the control device, Fig. 3 is an end view of the control device with the cover member removed showing the switch casing and electrical terminals, Fig. 4 is a view in section along the line 4—4 in Figure 1 showing the switch structure, Fig. 5 is a view in section taken along the line 5—5 in Figure 1 showing the switch structure, Fig. 6 is a fragmentary view in section similar to Fig. 5 showing the switch in open position, Fig. 7 is a fragmentary view in section similar to Fig. 5 showing the reset plunger depressed, Fig. 8 is a view in section taken along the line 8—8 in Fig. 5, and Fig. 9 is a view in perspective view of the switch casing and switch structure having parts broken away to better illustrate the invention.

Referring to the drawings by numerals of reference, there is shown a control device generally designated by the numeral 10. The control device 10 has a base plate 11 having a body portion 12 and flanged end portions 13 and 14. The body portion 12 has a pair of horizontally aligned indented portions 15 and 16. Each of the indented portions has a pair of horizontally slotted and longitudinally aligned apertures 17. The body portion also has a pair of securing bracket apertures 18 and an inwardly bent switch casing securing flange 19 with an aperture 20 therethrough. The top flange 13 has a conduit aperture 21 therethrough and a cover securing aperture 22 therethrough. A pair of gussets 23 add rigidity to the top flange 13. The bottom flange 14 has an elongated aperture 24 therethrough. The body portion 12 has an aperture 25 positioned between the aligned indented portions 15 and 16. An actuating element support frame 26 has a pair of parallel arm portions 27 and 28 which are secured to each other by an end portion 29. The end portion 29 has an inwardly extending flange 30. The arms 27 and 28 are channel shaped and each has a pair of split finger end portions 31. The split finger end portions 31 are inserted in their respective apertures 17 in the base plate body portion 12. The split finger portions 31 are bent in opposite directions and abut the inner wall of the base plate body portion 12 thereby rigidly securing the actuating element support frame 26 to the base plate 11. A bimetallic helically coiled actuating element 32 is secured by one of its free ends 33 to the actuating element support frame inwardly extending flange 30 and is positioned between the parallel arm portions 27 and 28. An actuating rod 34 extends through the aperture 25 in the base plate body portion 12 and has a cut-away end portion 35. The other end 36 of the rod 34 is secured to the other free end 37 of the bimetallic actuating element 32. Thus, upon change of temperature, the bimetalilc actuating element 32 will expand or contract and rotate the rod 34 in the aperture 25. A support bracket 38 has a flanged end portion 39 and a body portion 40. The flanged end portion 39 has a pair of longitudinally aligned apertures 41 suitable to secure the support bracket 38 to a furnace or the like. The support bracket body portion has a pair of horizontally aligned threaded apertures 42 which are aligned with the apertures 18 in the base plate body portion 12. A pair of screws 43 threadedly secure the support bracket 38 to the base plate 11. A U-shaped cover member 44 has inwardly bent top and bottom edge portions 45 constructed to fit over the base plate flange portions 13 and 14 thereby securing the cover member to the base plate 11. The cover member top portion has a pair of inwardly bent ears 46 that are aligned with the edges of the base plate top flange threaded aperture 22. A screw 47 is inserted in the aperture 22 and abuts the ear portions 46 thereby rigidly securing the cover member 44 to the base plate 11.

A swtich casing 48 abuts the inner wall of the base plate body portion 12, and its upper side wall has an outwardly extending abutment portion 49 which is positioned in the aperture 20 of the inwardly bent flange 19 thereby rigidly securing the switch casing to the base plate 12. The abutment portion 49 is clearly shown in Fig. 5.

As shown in Fig. 4, the switch casing 48 has a bottom wall 50 and side walls 51, 52, 53, and 54. The bottom wall 50 has a pair of terminal apertures 55 and 56 extending therethrough and a raised portion 57 defining abutment means for the terminals 58 and 59. The casing bottom wall 50 has slotted apertures designated as 60 and 61 spaced on opposite sides of each of the terminal apertures 55 and 56. The external side of the bottom wall has a pair of U-shaped raised portions 62 positioned around the terminal apertures 55 and 56 and are adapted to receive the external terminal portions 63 and 64. The external terminal portions 63 and 64 are U-shaped and each have arm portions 65 and 66 that extend through their respective slotted apertures 60 and 61. The external terminal portions 63 and 64 also have apertures aligned with the body terminal apertures 55 and 56. The terminal 58 has a body portion 67 with a pair of slotted apertures 68 and 69 therethrough. The terminal body portion 67 also has a threaded aperture 70 positioned between the slotted aperture 68 and 69 and the aperture 70 is aligned with the terminal aperture 55 in the switch casing bottom wall 50. The external terminal arm portions 65 and 66 extend through the slotted apertures 68 and 69 in the terminal body portion 67 and are dented as at 70ª to rigidly secure the external terminal portion 63 to the terminal body portion 67. A screw 71 operable to secure a wire to the external terminal portion 63 is threadedly secured in the terminal body portion aperture 70 with its head portion abutting the external terminal portion 63. The terminal body portion 67 has an upwardly extending flange 72 on which there is secured a switch contact member 73. The terminal 59 is similar in construction to the terminal 58 in that it has a pair of slotted apertures 68 and 69 and a threaded aperture 70. The external terminal arm portions 65 and 66 of the external terminal portion 64 similarly extend through the slotted apertures 68 and 69 in the terminal body portion 74 and are dented to rigidly secure the external terminal portion 64 with the terminal 59. The terminal body portion 74 has an upwardly extending flange portion 75 which has an aperture 76 therethrough. A screw 77 operable to secure a wire to the external terminal portion 64 is threadedly secured in the terminal body portion aperture 70 with its head portion abutting the external terminal portion 64.

The switch casing side wall 51 has a vertically extending slotted aperture 78 and flange portions 79 and 80 adjacent thereto. A reset plunger or button 81 having an enlarged head portion 82 is positioned with the head portion in the aperture 78 abutting the flange portions 79 and 80 and its free end extending beyond the casing side wall 51. The reset plunger 81 has its free end extend through the aperture 24 in the base plate flange 14 and is easily accessible for manual depression when the control device is assembled. The casing side wall 52 has a slotted aperture 83 therethrough and a pair of channel portions 84 and 85 positioned adjacent to the aperture 83. The switch casing side wall 53 has an inwardly extending abutment member 86 thereon. A switch arm 87 preferably constructed of a resilient material has a pair of apertures 88 and 89 therethrough. The aperture 89 is aligned with the terminal flange aperture 76 and a rivet 90 rigidly secures the switch arm 87 to the terminal 59. A switch contact 91 is positioned and secured in the switch aperture 88 and is substantially aligned with the switch contact 73. The switch arm 87 is biased toward open position and abuts the casing side wall abutment portion 86 when in an open position with its free end portion 87ª extending beyond the abutment portion 86. A lever member 92 which is operable to hold the switch arm 87 in a closed position so that contacts 73 and 91 will be in operative engagement with each other has a first arm portion 93 and a second arm portion 94. The first arm portion 93 abutting the casing side wall 51 has a body portion 95 and a pair of inwardly extending flange end portions 96 and 97. The arm portion 93 is preferably constructed of a resilient material and its body portion 95 has a tongue portion 98 formed therefrom that has its free end bent away from the body portion and forms a spring member. The flange portion 96 has a horizontal slot 99 with a central aperture 100 therethrough. The flange 97 has a vertical slot 101 therethrough.

The casing bottom wall 50 has an upwardly extending abutment portion 102 which has a flange portion 103 that is substantially aligned with the casing side wall 51. The first arm portion 93 is positioned within the casing 48 with the body portion 95 abutting the inner side of the side wall 51 and the aperture 100 in the flange 96 being aligned with the aperture 83 in the casing side wall 52. A screw guide member 104 having a central aperture 105 is inserted in the casing side wall channel portions 84 and 85 and an adjusting screw 106 extends through the aperture 105 and is threadedly secured in the arm flange aperture 100. The end portion of the screw 106 rests against the abutment member flange 103 so that the screw 106 is in substantial alignment with the first arm body portion 95 and the screw 106 is operable upon rotation to move the first arm flange 97 toward and away from the casing side wall 54. A coil spring 107 is positioned around the screw 106 and has one of its end portions abutting the flange 96 and its other end portion abutting the screw guide member 104 thereby biasing the first arm flange 96 away from the guide member 104. The first arm spring portion 98 abuts the casing abutment member 102 and biases the first arm body portion 95 against the casing side wall 51. The lever member second arm 94 which is in parallel spaced relation to the casing side wall 54 has a body portion 108 with an inwardly extending shoulder portion or catch 109 adjacent, but spaced inward from one of its ends and with an inwardly extending flange 110 at its other end. The catch 109 has a cam or inclined surface leading from the face of the arm 94 so that on reset operation the catch 109 can ride over the switch arm end 87ª. The flange 110 has an engaging portion 111 which extends from the flange 110 and which is in spaced parallel relation to the second arm body portion 108. A blade type spring member 112 has a body portion 113 and an outwardly bent arm portion 114. The body portion 113 has ear portions 115 extending vertically therefrom. The ear portions 115 are bent around the arm body portion 108 substantially adjacent to the flanged end portion 110 and rigidly secures the spring 112 to the second arm body portion 108 with the flange portion 114 extending outwardly therefrom in abutting engagement with the casing side wall 54. The second arm portion is positioned with the flange 110 extending through the slotted aperture 101 in the first arm flange 97 thereby pivotally securing the second arm portion 94 to the first arm portion 93 with the second arm engaging portion 111 extending inwardly into the casing and the second arm shoulder portion 109 being substantially adjacent to the switch arm 87. The spring 112 biases the second arm portion 108 against the end face of the switch arm 87 so that the shoulder portion 109 will abut and catch against the switch arm free end portion 87ª. Thus, when the switch arm free end portion 87ª is positioned under or against the shoulder portion 109, the bias of the first arm spring 98 will hold the switch arm 87 flexed and under tension so that the contact 91 will be in operative engagement with the switch contact 73.

An actuating member 116 has an arm 117 and a semi-circular aperture 118 therein. A cover member 119 is positioned over the casing side walls and substantially closes the open top portion of the casing 48. The cover member 119 has a central aperture 120 therethrough. The actuating rod 34 extends through the cover member aperture 120 and extends into the switch casing 48 with the cut-away end portion 35 being in laterally spaced relation to the engaging portion 111 of the second arm 94. The actuating member 116 is positioned with the rod cut-away portion 35 extending into the semi-circular aperture 118 thereby securing the actuating member 116 to the actuating rod 34 so that when the actuating rod 34 rotates the actuating member 116 will also rotate. The actuating member 116, when thus secured, has its actuating arm portion 117 in spaced relation to the lever second arm actuating engaging portion 111. Thus, upon rotation of the rod 34, the actuating arm 117 will move into operative engagement with the engaging portion 111 and pivot the second arm 94 so that the second arm shoulder portion 109 will move away from under the switch arm free end 87ª and permit the switch 87 to move to an open position and rest against the casing abutment portion 86.

*Operation*

The control device is secured by means of the support bracket to a portion of a furnace or a heating unit with the bimetallic actuating element 32 being positioned in the heated air stream or in a position where it is responsive to the temperature of the heating unit. The control device is operable to break the line voltage supply circuit that supplies electrical energy to the heating unit should the air temperature reach a maximum allowable limit in the heating unit. Thus, the control device protects the heating system against blower failure or other abnormalities in the heating system.

When the control device is installed, the switch is closed by manually depressing the reset plunger 81 which will move the lever first arm portion 93 against the bias of the spring tongue portion 98 and move the second lever shoulder portion 109 under or beyond the free end 87a of the normally opened switch arm 87. As the lever end portion 109a is resting under the force of spring 112 upon the end face of switch arm 87, the cam surface of the shoulder 109 will cause the shoulder to ride over the switch arm into latching position. Upon release of the manual reset plunger 81, the first arm spring tongue portion 98 will bias the first arm 93 against the switch casing side wall 51 and move the second arm shoulder portion toward the casing side wall 51. This movement of the shoulder 109 which is engaging the switch arm 87 will move the switch arm to a closed and tensioned position wherein the switch arm contact 91 will abut the stationary contact 73, thus closing the contact and completing the circuit through the switch. Thus, when the wires of the electrical circuit controlling the heating unit are secured under the terminal screws 71 and 77, a completed circuit through the switch will result.

During the operation of the heating unit, the air temperature increases and the bimetallic actuating element 32 will expand and rotate the actuating rod 34. The actuating rod 34 in turn will rotate the actuating member 116 secured to the free end of the rod 34 within the switch casing. Upon rise of temperature the actuating member arm 117 will rotate toward the lever second arm engaging portion 111. During normal operation of the heating unit where the temperature does not exceed a predetermined limit, the actuating member arm portion 117 will not engage the lever engaging portion 111. Should the temperature in the heating unit exceed a predetermined temperature, the bimetallic actuating element 32 will continue to expand and rotate the actuating rod 34. The actuating rod 34 will in turn rotate the actuating member 116 so that the arm portion 117 will engage the engaging portion 111 of the lever second arm 94. The actuating member arm portion 117 will exert a force on the lever arm engaging portion 111. This force is in opposition to the bias of the blade type spring member 112. When the rotative force of the actuating element 116 exceeds the force exerted by the blade type spring 112, the lever arm 94 will pivot about its connection with the first arm portion 93 and the second arm shoulder portion 109 will move out of opposing or latching engagement with the switch arm free end portion 87a. Since the switch arm 87 is biased toward an open position, then as the lever second arm shoulder portion 109 moves out of engagement with the switch arm free end portion 87a, the switch arm 87 will move to an open position and abut the inwardly extending casing abutment portion 86 and disconnect the contacts 91 and 73, thus opening the circuit in the electrical system of the heating unit. The abutment portion 86 limits the movement of the switch arm 87 so that it cannot move beyond a position where the lever arm portion 109a can rest upon it. Since the electrical system has been de-energized, the blower and other heating means controlled by this electrical circuit will also be de-energized and the temperature of the heating unit will decrease below the predetermined temperature. If the temperature so decreases, the bimetallic actuating element 32 will contract and rotate the rod 34 in a direction opposite to the direction of rotation when the bimetallic element is expanding. In turn, the actuating member arm portion 117 will rotate away from the lever second arm engaging portion 111 and permit the bias of the blade type spring 112 to move the lever arm portion 109a into abutting engagement with the end edge of the switch arm free end portion 87a. Thus, the switch arm 87 will continue to abut the casing abutment portion 86 and maintain the switch contacts 91 and 73 in an open disengaged position.

In order to close the heating unit electrical circuit, it is necessary that the switch be closed manually. To close the switch manually, the reset plunger 81 must be depressed against the lever first arm portion 93. The depression of the manual reset plunger 81 will move the lever first arm portion 93 against the bias of the tongue spring portion 98. The movement of the lever first arm portion will in turn move the lever second arm portion 94 so that the shoulder portion 109 will move under the switch arm free end portion 87a. Upon release of the manual reset plunger 81 the bias of the spring tongue portion 98 will move the lever first arm portion 93 into abutting relation with the casing side wall 51. The movement of the lever first arm portion will in turn move the lever second arm portion 94 toward the casing side wall 51. The lever second arm shoulder portion 109 which is positioned under the switch arm free end portion 87a will move the switch arm 87 to a closed position where the contact 91 will abut the stationary contact 73 and again close the electrical circuit in the heating system.

Should the condition of elevated temperature in the heating unit be present when it is attempted to manually reset the control device, the switch is so constructed that it is not possible to reset the same when the condition of elevated temperature is present. Assuming that the condition of elevated temperature is present, the actuating member arm portion 117 will remain in engagement with the lever second arm engaging portion 111 and the rotative force of the actuating member 116 will oppose the force of the blade type spring so that the lever second arm portion 94 will be in a position substantially as shown in Fig. 6 with the second arm shoulder portion 109 in spaced relation to the switch arm free end portion 87a. Thus, upon depression of the reset plunger 81 against the lever first arm portion 93, the lever second arm portion 94 will move toward the casing side wall 53. However, since the shoulder portion 109 is in spaced relation to the switch arm free end portion 87a, it is not possible for the shoulder portion 109 to engage the switch arm free end portion 87a and move the switch arm 87 to a closed position when the reset plunger 81 is released and the lever first arm portion 93 is returned to abutting relation with the casing side wall 51. Therefore, when the elevated temperature is present, it is not possible to close the switch contacts by means of the manual reset plunger.

The control device has an adjustment means to permit the adjusting of the point at which the actuating arm 117 will overcome the biasing force of the blade spring 112 and move the shoulder portion 109 out from under the switch arm free end portion 87a. The adjustment means is the screw member 106 that is threadedly secured to the first arm flange portion 96. Upon rotation of the screw member 106, the lever first flange portion 97 will move toward or away from the casing side wall 54. Since the lever second arm portion 94 is pivotally secured to the lever first arm flange portion 97, the lever second arm portion 94 will also move toward or away from the casing side wall 54. The blade type spring 112 will continue to bias the lever second arm portion 94 away from the casing side wall 54. The movement of the lever second arm portion 94 toward or away from the casing side wall 54 determines the distance that the actuating member arm portion 117 must rotate until it moves into operative engagement with the lever second arm engaging portion 111. Thus, if the screw 106 is rotated so that the lever first arm flange portion 97 is moved toward the casing side wall 54, the lever second arm engaging portion 111 is moved a greater distance from the actuating member arm portion 117. Therefore, the bimetallic actuating element 32 must expand a greater amount to rotate the rod 34 a greater distance so that the actuating element arm portion 117 must rotate a greater distance to engage the lever second arm engaging portion 111 in order to move the lever second arm shoulder portion 109 out from under the switch arm free end portion 87ª. Thus, it will require a higher temperature to open the contacts of the switch. When the screw 106 is rotated so that the lever first arm flange portion 97 is moved away from the casing side wall 54, the lever second arm engaging portion 111 is moved closer to the actuating element arm portion 117 and it will require less rotational movement of the actuating element arm portion 117 to engage the lever second arm engaging portion 111 to move the lever second arm shoulder portion out from under the switch arm free end portion 87ª. This adjustment means therefore permits the control device to be adjusted so that it will open the switch at various predetermined temperatures and is not confined to a single temperature of operation.

Having thus described the invention, what is claimed and is desired to be secured by Letters Patent of the United States is:

1. In a control device comprising in combination, a longitudinally movable and pivoted lever having a latch means thereon, a switch arm biased toward an open position and operable to engage said latch means, means relatively biasing said lever means into engagement with said switch arm, second biasing means operable to move said lever longitudinally to engage said latch means with said switch arm, said second biasing means acting through said latch means to move said switch arm to closed position, actuating means operable upon the occurrence of a predetermined condition to disengage said switch arm from said latch means so that said switch arm will move to an open position, and reset means operable to move said lever bodily toward said switch arm so that in the absence of said predetermined condition said latch means will engage said switch arm and said second biasing means will move said switch arm to a closed position.

2. In a control device comprising in combination, a longitudinally movable and pivoted lever having a latch means thereon, a switch arm biased toward an open position and operable to engage said latch means, means relatively biasing said lever into engagement with said switch arm, second biasing means operable to move said lever longitudinally to engage said latch means with said switch arm, said second biasing means acting through said latch means to move said switch arm to closed position, actuating means operable upon the occurrence of a predetermined condition to move said lever and disengage said switch arm from said latch means so that said switch arm will move to an open position, reset means operable to move said lever toward said switch arm so that in the absence of said predetermined condition said latch means will engage said switch arm and said second biasing means will move said switch arm to a closed position, and adjustment means operable to cause said actuating means to engage said lever and disengage said switch arm from said latch means at a different predetermined condition.

3. In a control device comprising in combination a casing, a lever pivotally secured to said casing and having a shoulder portion adjacent its free end, a switch arm secured at one end to said casing and being biased toward an open position, said switch arm free end portion being positioned substantially normal to said lever free end and adjacent to said shoulder portion, a spring member biasing said lever toward said switch arm free end, a second spring member biasing said lever so that said switch arm free end engages said shoulder portion and said shoulder portion holds said switch arm in a closed position, a rotatable actuating arm positioned in spaced relation to said lever and operable upon the occurrence of a predetermined condition to rotate into engagement with said lever and disengage said switch arm from said shoulder portion so that said switch arm will move to an open position, said actuating arm being operable to remain in engagement with said lever and maintain said switch in an open position during the continuance of said predetermined condition, and reset means comprising a button member abutting said first lever and manually operable to move said first lever against said second spring so that in the absence of said predetermined condition said shoulder portion will engage said switch arm and said second spring will move said switch arm to a closed position upon release of said button member.

4. In a control device comprising in combination a casing, a lever pivotally secured to said casing and having a shoulder portion adjacent its free end, a switch arm secured at one end to said casing and being biased toward an open position, said switch arm free end portion being positioned substantially normal to said lever free end and adjacent to said shoulder portion, a spring member biasing said lever toward said switch arm free end, a second spring member biasing said lever so that said switch arm free end engages said shoulder portion and said shoulder portion holds said switch arm in a closed position, a rotatable actuating arm positioned in spaced relation to said lever and operable upon the occurrence of a predetermined condition to rotate into engagement with said lever and disengage said switch arm from said shoulder portion so that said switch arm will move to an open position, said actuating arm being operable to remain in engagement with said lever and maintain said switch in an open position during the continuance of said predetermined condition, reset means comprising a button member abutting said lever and manually operable to move said lever against the bias of said second spring so that in the absence of said predetermined condition said shoulder portion will engage said switch arm and said second spring will move said switch arm to a closed position upon release of said button member, and an adjustment means operable to vary the position of said lever relative to said actuating arm thereby determining the extent of rotation of said arm for engagement with said lever.

5. In a control device comprising in combination a casing, a lever pivotally secured to said casing and having a shoulder portion adjacent its free end, a switch arm secured at one end to said casing and being biased toward an open position, stop means operable to limit the opening movement of said switch arm, said switch arm free end portion being positioned substantially normal to said lever free end and adjacent to said shoulder portion, a spring member biasing said lever so that said switch arm free end engages said shoulder portion, a second spring member biasing said lever so that said shoulder portion holds said switch arm in closed position, a rotatable actuating arm secured to a means responsive to temperature and operable to rotate a predetermined distance upon a given elevation in temperature, said actuating arm being positioned in spaced relation to said lever and operable upon said change in temperature to rotate into engagement with and pivot said lever to disengage said switch arm from said shoulder portion so that said switch arm will move to an open position and abut said stop means, said actuating arm being operable to remain in engagement with said lever and maintain said switch arm in spaced relation to said shoulder during the continuance of said predetermined elevated temperature, reset means comprising a button member abutting said lever and manually operable to move said lever against the bias of said second spring to position said shoulder portion under said switch arm free end portion upon the absence of said predetermined elevated temperature, and upon manual release of said button member said second spring will move said switch arm to closed position.

6. In a control device, a casing having a bottom wall and side walls, said bottom wall having a pair of terminals secured thereto and extending into said casing, one of said terminals having a contact arm secured thereto, a switch arm secured at one end to said other terminal and having its other free end portion biased toward an open position away from said contact arm, said casing having a stop portion extending inwardly from its side wall adjacent to said contact arm, said stop portion being operable to limit the opening movement of said switch arm, said switch arm free end portion extending beyond said stop portion when in an open position, a lever member positioned within said casing and being operable to hold said switch arm in a closed position abutting said contact arm, said lever member having a first arm and a second arm, said first arm having a body portion with an inwardly bent flange end portion, said flange end portion having a slotted aperture therethrough, said body portion having a longitudinal inwardly bent spring portion, said second arm having a body portion with an inwardly extending shoulder portion adjacent one end thereof and an inwardly extending flanged portion at the other end, said body portion having a cam portion positioned between said shoulder portion and said first named end portion, said last named flange portion having an engaging portion extending therefrom in spaced parallel relation to said second arm body portion, a spring member secured at one end to said second arm body portion substantially adjacent to said last named flange portion and extending away from said second arm body portion so that said spring other end is in spaced relation to said second arm body shoulder portion, said second arm flange portion being positioned in said first arm slotted aperture thereby forming a pivotal connection between said first arm and said second arm, said lever member being secured in said casing with said first arm body portion abutting the inner side of said casing side wall substantially parallel to said switch arm, said casing bottom wall having an abutment portion extending inwardly therefrom, said first arm inwardly bent spring portion abutting said abutment portion and biasing said first arm body portion against said casing side wall, said spring member abutting an inner side of another side wall of said casing and biasing said second arm away from said last named side wall and toward said switch arm free end portion, said spring being operable to move said second arm shoulder portion into operative engagement with said switch arm free end portion, said first arm spring portion being operable to hold said switch arm in closed position abutting said contact arm when said switch arm free end portion engages said second arm shoulder portion, a post member having one end secured to a rotatable thermostatic element and its other free end extending into said casing, an actuating arm secured to and rotatable with said post, said actuating arm being positioned in spaced relation to said engaging portion of said second arm and operable upon rotation to engage said second arm engaging portion and pivot said second arm about said first arm against the bias of said spring so that said second arm shoulder portion will be disengaged from said switch arm free end portion and said switch arm will move to an open position against said stop portion, and a reset button extending through an aperture in said casing side wall and abutting said first arm body portion adjacent to said flange portion, said reset button being operable to move said first arm portion against the bias of said first arm inwardly bent spring portion and in the absence of said actuating arm member engaging said second arm engaging portion said switch arm free end portion will slide along said cam portion and engage said shoulder portion and upon the release of said reset button said switch arm will move to a closed position abutting said contact arm.

7. In a control device, a casing having a plurality of side walls, a bottom wall, and an open top portion, said bottom wall having a pair of terminals therein, one of said side walls having a slotted aperture therethrough, a second side wall having an aperture therethrough substantially adjacent to said first side wall, one of said terminals having an inwardly extending contact arm, the other of said terminals having an inwardly extending switch arm securing portion, a switch arm secured at one end to said last named terminal securing portion and having its other end biased toward an open position away from said first named terminal contact arm, said casing having a stop portion extending inwardly from its side wall adjacent said terminal contact arm and operable to limit opening movement of said switch arm, said switch arm free end portion extending beyond said stop portion when in an open position; a lever member positioned within said casing and having a first arm and a second arm and being operable to hold said switch arm in a closed position abutting said contact arm, said first arm having a body portion with inwardly bent flange end portions, one of said flanged end portions having a slotted aperture therethrough, the other of said flanged end portions having a threaded aperture therethrough, said body portion having a longitudinal inwardly bent spring portion, said second arm having a body portion with an inwardly extending shoulder portion at one end thereof and an inwardly extending flanged portion at the other end, said body portion having a cam portion positioned between said shoulder portion and said first named free end portion, said flange portion having an engaging portion positioned in spaced parallel relation to said second arm body portion, a blade type spring member secured at one end to said second arm body portion substantially adjacent said flange end portion and extending outwardly therefrom so that said spring other end is in spaced relation to said shoulder portion, said second arm flange portion being positioned in said first arm slotted aperture with said second arm engaging portion extending toward said first arm other flange portion thereby forming a pivotal connection between said second arm and said first arm, said lever member being positioned in said casing with said first arm portion abutting said casing first named side wall and being substantially parallel to said switch arm, said casing having an abutment portion extending inwardly from said bottom wall substantially adjacent to said first named side wall, said first arm inwardly bent spring portion abutting said abutment portion and biasing said first arm body portion against the inner side of said first named casing side wall, a screw member extending through said second side wall aperture and threadedly secured to said lever first arm other flange portion, said screw member being operable upon rotation to move said flanged portions toward and away from said second wall, a coil type spring positioned around said screw member and having one end abut said first arm other flange and its other end abut said casing side wall thereby biasing said first arm away from said casing second side wall, said blade type spring member abutting the casing side wall opposite said second side wall and biasing said second arm toward said switch arm free end portion and operable to move said second arm shoulder portion into operative engagement therewith, a cover member positioned over said casing open top portion and having a central aperture therethrough, a thermostatically rotatable post member extending through said aperture and rotatable therein upon a predetermined change of temperature, an actuating arm member secured to said post member within said casing and being rotatable therewith, said actuating arm member being positioned in spaced relation to said engaging portion of said second arm and operable upon rotation to engage said second arm engaging portion and pivot said second arm about said first arm against the bias of said blade type spring so that said second arm shoulder portion will disengage said switch arm free end portion and said switch arm will move to an open position against said stop portion, and a reset button extending through said side wall slotted aperture and abutting said first arm body portion, said reset button being operable to move said first arm portion against the bias of said first arm inwardly bent spring portion, and in the absence of said actuating arm member engaging said second arm engaging portion, upon movement of said reset button towards said switch arm said switch arm free end portion will slide along said cam portion and engage said shoulder portion, and upon release of said reset button said switch arm will move to a closed position, and said screw member operable upon rotation to vary the position of said second arm engaging portion thereby determining the extent of rotation of said actuating arm for engagement with said second arm engaging portion.

8. In a switch, a switch arm biased toward an open position, means to close said switch comprising a longitudinally movable and pivoted lever having latch means thereon, spring means operable to rotate said lever into engagement with said switch arm, second spring means operable to move said lever longitudinally toward a switch closed position and to urge said latch means against said switch arm to close said switch, actuating means operable upon the occurrence of a predetermined condition to disengage said switch arm from said latch means, and reset means operable to close said switch, said reset means being inoperative to reset said switch while said predetermined condition exists.

9. In a switch, a casing having a stop means therein, a switch arm secured at one end to said casing and biased toward an open position abutting said stop means, said switch arm other end extending beyond said stop means, means to close said switch comprising a lever pivotally secured at one end to said casing, said lever having a shoulder portion adjacent its other end, said lever having a cam portion between said shoulder and said other end, spring means operable to bias a portion of said lever adjacent to said shoulder portion against said switch arm free end portion, second spring means operable to bias said shoulder portion toward a switch closed position so that when said switch arm free end portion is positioned over said shoulder portion said second spring means will hold said switch in a closed position, actuating means operable upon the occurrence of a predetermined condition to engage and pivot said lever and disengage said switch arm free end portion from said shoulder portion thereby permitting said switch to move to an open position, and reset means comprising a button operable in the absence of said predetermined condition to move said lever against the bias of said second spring means and slide said switch arm free end portion along said cam portion and over said shoulder portion, said button being releasable to permit said second spring means to move said switch arm to a closed position.

10. In a switch, a casing having a stop means therein, a switch arm secured at one end to said casing and biased toward an open position abutting said stop means, said switch arm other end extending beyond said stop means, means to close said switch comprising a lever pivotally secured at one end to said casing, said lever having a shoulder portion adjacent its other end, said lever having a cam portion between said shoulder and said other end, spring means operable to bias a portion of said lever adjacent to said shoulder portion against said switch arm free end portion, second spring means operable to bias said shoulder portion toward a switch closed position so that when said switch arm free end portion is positioned over said shoulder portion said second spring means will hold said switch in a closed position, actuating means operable upon the occurrence of a predetermined condition to engage and pivot said lever and disengage said switch arm free end portion from said shoulder position thereby permitting said switch to move to an open position, reset means comprising a button operable in the absence of said predetermined condition to move said lever against the bias of said second spring means and slide said switch arm free end portion along said cam portion and over said shoulder portion, said button being releasable to permit said second spring means to move said switch arm to a closed position, and adjustment means operable to cause said actuating means to engage said lever and disengage said switch arm free end portion from said shoulder portion at a different predetermined condition.

11. In a control device, a movable resetting arm, resilient means urging said arm in one direction, means to move said arm in the opposite direction, a lever pivoted on said arm and bodily movable therewith, a switch arm biased in said opposite direction, latch means on said lever and engageable with said switch arm to move switch arm in said one direction, a spring acting to rotate said lever and urging said latch means into the path of movement of said switch arm, and means to pivot said lever to disengage said latch means from said switch arm.

References Cited in the file of this patent

UNITED STATES PATENTS

| | | |
|---|---|---|
| 2,191,588 | Sattler | Feb. 27, 1940 |
| 2,583,174 | Hart | Jan. 22, 1952 |
| 2,593,301 | Havasi | Apr. 15, 1952 |
| 2,610,273 | Judson | Sept. 9, 1952 |